United States Patent [19]
Duffy et al.

[11] Patent Number: 5,745,322
[45] Date of Patent: Apr. 28, 1998

[54] CIRCUIT PROTECTION ARRANGEMENTS USING GROUND FAULT INTERRUPTER FOR OVERCURRENT AND OVERVOLTAGE PROTECTION

[75] Inventors: Hugh Duffy, Cupertino; Justin Chiang, Newark; John Midgley, San Carlos; Brian Thomas, San Francisco, all of Calif.

[73] Assignee: Raychem Corporation, Menlo Park, Calif.

[21] Appl. No.: 563,321

[22] Filed: Nov. 28, 1995

Related U.S. Application Data

[60] Provisional application Nos. 60/003,733, Sep. 14, 1995 and 60/003,743, Sep. 14, 1995.

[51] Int. Cl.$^6$ .................................................. H02H 3/16
[52] U.S. Cl. ................................ 361/45; 361/46; 361/93; 361/91
[58] Field of Search ................... 361/42–50, 56–58, 361/86, 87, 93, 91

[56] References Cited

U.S. PATENT DOCUMENTS

| | | | |
|---|---|---|---|
| 3,970,975 | 7/1976 | Gryctko | 335/18 |
| 4,044,395 | 8/1977 | Eckart | 361/44 |
| 4,068,276 | 1/1978 | Pintell | 361/46 |
| 4,084,203 | 4/1978 | Dietz et al. | 361/45 |
| 4,115,829 | 9/1978 | Howell | 361/42 |
| 4,233,640 | 11/1980 | Klein et al. | 361/44 |
| 4,344,100 | 8/1982 | Davidson et al. | 361/45 |
| 4,348,708 | 9/1982 | Howell | 361/45 |
| 4,521,824 | 6/1985 | Morris et al. | 361/45 |
| 4,598,331 | 7/1986 | Legatti | 361/46 |
| 4,618,907 | 10/1986 | Leopold | 361/45 |
| 4,816,958 | 3/1989 | Belbel et al. | 361/93 |
| 4,931,894 | 6/1990 | Legatti | 361/45 |
| 4,949,214 | 8/1990 | Spencer | 361/95 |
| 4,994,933 | 2/1991 | Matsuoka | 361/42 |
| 5,177,657 | 1/1993 | Baer et al. | 361/45 |
| 5,179,490 | 1/1993 | Lawrence | 361/42 |
| 5,198,955 | 3/1993 | Willner | 361/42 |
| 5,202,662 | 4/1993 | Bienwald et al. | 335/18 |
| 5,361,183 | 11/1994 | Wiese | 361/42 |

FOREIGN PATENT DOCUMENTS

| | | | |
|---|---|---|---|
| 2022304 | 1/1992 | Canada | H01R 13/713 |
| 0 373 676 A2 | 6/1990 | European Pat. Off. | H02H 9/04 |
| 1 763 550 | 8/1971 | Germany | H02H 5/04 |
| 2260043 | 3/1993 | United Kingdom | H02H 3/10 |

OTHER PUBLICATIONS

*Technology for Detecting and Monitoring Conditions that Could Cause Electrical Wiring System Fires*, Underwriters Laboratories Inc., Sep. 1995.

Primary Examiner—Jeffrey A. Gaffin
Assistant Examiner—Michael J. Sherry
Attorney, Agent, or Firm—Herbert G. Burkard

[57] ABSTRACT

An electrical protection system which uses a ground fault interrupter (GFI) to protect a circuit from (A) ground faults and (B) overcurrents and/or overvoltages. For overcurrent protection, a control element may be coupled in series with the line or return input to the GFI, and a bypass element may be coupled in parallel with the control element and the GFI. In case of an overcurrent, the control element causes current to be diverted through the bypass element, thereby creating a current imbalance in the GFI circuitry causing the GFI to open the circuit. For overvoltage protection, a bypass element (e.g. a varistor) may be coupled between, e.g., the line sense input of the GFI and the return sense input of the GFI. In case of an overvoltage, the bypass element conducts current, thereby creating a current imbalance in the GFI circuitry causing the GFI to open the circuit.

52 Claims, 8 Drawing Sheets

CIRCUIT PROTECTION ARRANGEMENTS USING GROUND FAULT INTERRUPTER FOR OVERCURRENT AND OVERVOLTAGE PROTECTION

RELATED APPLICATIONS

This application is related to copending, commonly assigned U.S. patent application Ser. No. 08/564,465 which includes the same subject matter as disclosed in U.S. Provisional patent application Ser. No. 60/003,733 filed Sep. 14, 1995, and copending commonly assigned U.S. patent application Ser. No. 08/564,495 which includes the same subject matter as disclosed in U.S. Provisional patent application Ser. No. 60/003,743 filed Sep. 14, 1995, the disclosures of which are incorporated herein by reference for all purposes.

BACKGROUND OF THE INVENTION

1. Field of the Invention

The present invention relates to electrical circuit protection.

2. Introduction to the Invention

Ground fault interrupters (GFIs) are widely used to provide protection from the harmful effects which can result when there is leakage from an electrical circuit to ground. GFIs compare the current flowing at two different locations in a circuit, and interrupt the circuit if the currents differ by more than a predetermined value, e.g. as the result of a ground fault between the locations. GFIs do not, however, protect against faults which do not result in such a current imbalance, e.g. an overcurrent resulting from a short within the load, or an overvoltage arising from lightning, electrostatic discharge, switching of reactive loads, etc.

SUMMARY OF THE INVENTION

We have been investigating the use of GFIs in arrangements which provide overcurrent and/or overvoltage protection in electrical circuits in addition to protection from ground faults. We have discovered, in accordance with this invention, that very useful overcurrent and overvoltage protection systems can be produced using GFIs. In one embodiment of the invention, overcurrent protection is provided by connecting a first control element in series with the line path of a GFI, and a first bypass element in parallel with the combination of the first control element and the line path of the GFI. Under normal current conditions, little or no current flows through the first bypass element. However, when an overcurrent passes through such a system, the voltage across the first control element increases, causing the current passing through the first bypass element to increase, thereby creating a current imbalance in the GFI and causing the GFI to trip.

In another embodiment of the invention, overvoltage and/or overcurrent protection is provided by connecting a first bypass element: 1) from the line path input of a GFI, through the GFI transformer, to the return path output of the GFI; 2) from the line path input of a GFI to the return path input of the GFI; 3) from the line path output of a GFI through the GFI transformer, to the return path input of the GFI; or 4) from the line path output of a GFI to the return path output of the GFI. Under normal conditions, little or no current flows through the first bypass element. However, when an overvoltage or overcurrent appears in the system, an increased current passes through the first bypass element creating a current imbalance in the GFI and causing the GFI to trip.

Thus, in accordance with the invention, commonly available GFI devices may be used to provide integrated overcurrent and/or overvoltage protection in electrical circuits, devices and systems, in addition to protection from ground faults. Such protection provided by GFIs may supplement or replace overcurrent and/or overvoltage protection previously provided in such circuits by separate protection systems. This invention can be used to advantage in many applications ranging, for example, from wall outlets supporting individual consumer devices to industrial power systems.

In one preferred aspect, this invention provides an electrical protection system which can be connected between an electrical power supply and an electrical load to form an operating circuit having a current-carrying line and a return line, and which, when so connected, protects the operating circuit from (A) ground faults and (B) overcurrents and/or overvoltages, which system comprises:

a. a circuit interruption element, which, when the system is so connected, can adopt a normal state which permits the flow of a normal current, $I_{NORMAL}$, in the circuit, or a fault state which permits the flow of at most a reduced current, substantially less than $I_{NORMAL}$, in the circuit;

b. a comparison element, which, when the system is so connected, (1) comprises (a) a line sense component which senses the level of a current, $I_{LINE}$, in the current-carrying line of the circuit at a line sense point between a line sense input and a line sense output, (b) a return sense component which senses the level of a current, $I_{RETURN}$, in the return line of the circuit at a return sense point between a return sense input and a return sense output, and (c) optionally, a passthru sense component which senses the level of a current, $I_{PASSTHRU}$, at a passthru sense point in a passthru line, and (2) determines a net effective current, $I_{COMPARISON}$, by comparing the levels of $I_{LINE}$, $I_{RETURN}$ and $I_{PASSTHRU}$, and changes the circuit interruption element from its normal state to its fault state if $I_{COMPARISON}$ increases from a value less than a predetermined current imbalance value, $I_{IMBALANCE}$, to a value more than $I_{IMBALANCE}$; and c. a first bypass element which, when the system is so connected, has a current through it, $I_{BYPASS}$, which, when the circuit is subjected to an overcurrent and/or an overvoltage, changes and thus causes $I_{COMPARISON}$ to increase to more than $I_{IMBALANCE}$, thereby causing the comparison element to change the circuit interruption element from its normal state to its fault state.

In another preferred aspect, this invention provides an electrical circuit comprising a power supply, a load, a current-carrying line, a return line and an electrical protection system which protects the circuit from (A) ground faults and (B) overcurrents and/or overvoltages, which system comprises:

a. a circuit interruption element, which can adopt a normal state which permits the flow of a normal current, $I_{NORMAL}$, in the circuit, or a fault state which permits the flow of at most a reduced current, substantially less than $I_{NORMAL}$, in the circuit;

b. a comparison element, which (1) comprises (a) a line sense component which senses the level of a current, $I_{LINE}$, in the current-carrying line of the circuit at a line sense point between a line sense input and a line sense output, (b) a return sense component which senses the level of a current, $I_{RETURN}$, in the return line of the circuit at a return sense point between a return sense input and a return sense output, and (c) optionally, a passthru sense component which senses the level of a current, $I_{PASSTHRU}$, at a passthru sense point in a passthru line, and (2) determines a net effective current, $I_{COMPARISON}$, by comparing the levels of $I_{LINE}$, $I_{RETURN}$ and $I_{PASSTHRU}$, and changes the circuit interruption element from its normal state to its fault state if $I_{COMPARISON}$ increases from a value less than a predetermined current imbalance value, $I_{IMBALANCE}$, to a value more than $I_{IMBALANCE}$; and c. a first bypass element which has a current through it, $I_{BYPASS}$, which, when the circuit is subjected to an overcurrent and/or an overvoltage, changes and thus causes $I_{COMPARISON}$ to increase to more than $I_{IMBALANCE}$, thereby causing the comparison element to change the circuit interruption element from its normal state to its fault state.

The term "ground fault" is used in this specification to denote any fault, external to a comparison element such as a GFI, which causes a current to flow in one sense line of the comparison element, which is not matched by an equal and opposite current in the other sense line of the comparison element. The term "external to a comparison element" is used in this specification to refer to any point in a circuit between the line sense output of the comparison element and the return sense input of the comparison element.

The protection systems of the invention may be configured to provide both overcurrent and overvoltage protection in addition to the normal ground fault interrupt protection provided by the GFI or other comparison element. They may also be configured to provide only overcurrent or only overvoltage protection in addition to the ground fault interrupt protection.

BRIEF DESCRIPTION OF THE DRAWINGS

The invention is illustrated in the accompanying drawings, in which like components are given the same reference numerals in each FIG. in which they appear, and like components shown comprising additional features in subsequent FIGs. are given the same reference number with a prime (e.g., 10', 114'), and in which.

DETAILED DESCRIPTION OF THE INVENTION

Figure 1:
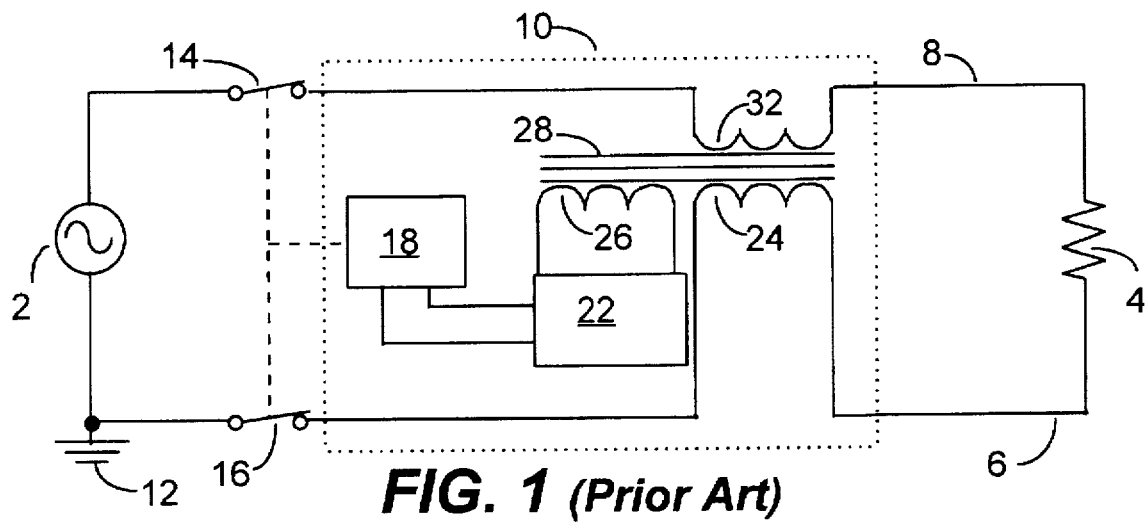
FIG. 1 is a circuit diagram of a known circuit including a conventional GFI device.

This invention provides a circuit protection system which provides protection from (A) ground faults and (B) overcurrent and/or overvoltage protection in electrical circuits. For ease of understanding, the detailed description and drawings relate to systems which provide, in addition to ground fault protection, either overcurrent protection or overvoltage protection, but not both. However, the systems described in this way can readily be combined to provide both overcurrent and overvoltage protection, in addition to ground fault protection.

One of the merits of this invention is that it can make use of GFI devices which are widely available, or of simple modifications of such devices. In the detailed description of the invention, therefore, reference will often be made to the GFI circuits as performing the function of a comparison element. It is to be understood, however, that the invention can make use of any comparison element which will provide the defined functional characteristics.

The predetermined current imbalance, $I_{IMBALANCE}$, which will "trip" the comparison element (i.e. cause it to change from its normal state to its fault state) is preferably a fixed value in the range of 5 to 20 milliamps, which represents typical GFI specifications. However, lower or higher values of $I_{IMBALANCE}$ can be used if greater or less sensitivity to ground faults can be specified.

The comparison element will normally have a single fixed value of $I_{IMBALANCE}$, but it is also possible for the comparison element to include means for changing the value of $I_{IMBALANCE}$ from one predetermined value to another.

As discussed in detail below, while the level of $I_{IMBALANCE}$ which trips a GFI is a predetermined value, in some embodiments of the invention, the level of the ground fault leakage current which will trip the GFI (in the absence of an overcurrent or overvoltage) may be changed by the presence of other components optionally used in the present invention.

A GFI generally comprises a transformer ring having (i) a primary line winding, (ii) a corresponding primary return line winding, and (iii) a secondary winding which connects to a level detection circuit, and, in addition a separate test wire which passes through the transformer ring and is used when testing the GFI. When such a GFI is used in this invention, the primary line winding is made part of the line of the circuit and provides the line sense point as it passes through the transformer ring; and the primary return line winding is made part of the return line of the circuit and provides the return sense point as it passes through the transformer ring. When the system of the invention includes a passthru line, the separate test wire is used as the passthru line and provides the passthru sense point as it passes through the transformer ring. When there is no passthru line, the separate test wire is not used and does not affect the operation of the system. The transformer ring and the primary line winding together provide the line sense component, and the transformer ring and the primary return line winding together provide the return sense component. When a passthru line is used, the transformer ring and separate test wire together provide the passthru sense component. The transformer ring, the secondary winding and the level detection circuit in the GFI provide the comparison element.

The net effective current, $I_{COMPARISON}$, is the net current sensed by the transformer ring from the contributions of currents in the primary line winding, the primary return line winding and, if used, the separate test wire. A current proportional to $I_{COMPARISON}$ is generated in the secondary winding and is sensed by the level detection circuit, which, when the current in the secondary winding indicates that $I_{COMPARISON}$ increases from a value below $I_{IMBALANCE}$ to a value above $I_{IMBALANCE}$, energizes (or deenergizes) a GFI relay and disconnects the load from the circuit.

A conventional GFI can, if desired, be modified so that a passthru line passes through the transformer ring two or more times to obtain amplification of the effect of $I_{BYPASS}$.

In a first embodiment of the invention, which embodiment provides overcurrent protection, the first bypass element of the system includes a single bypass component which is connected so that it spans one, but not both, of the line sense point and the return sense point. Such a bypass component is referred to herein as a first bypass component. In this embodiment, which does not make use of the passthru sense, a single control element is series connected in the line (or return line) of the operating circuit within the span of the first bypass component. Such a control element is referred to herein as a first control element. In this embodiment, the first control element is selected so that the voltage across it, $V_{FIRST-CONTROL}$, increases if the operating circuit is exposed to an overcurrent, thus causing an increase in the voltage across the first bypass component, $V_{FIRST-BYPASS}$, and a resulting increase in the current, $I_{FIRST-BYPASS}$, through the first bypass component.

The first embodiment of the invention can employ a first control element comprising a series resistor ($R_S$), and a first bypass component comprising a bypass resistor ($R_B$), with the resistances of the two resistors having the relationship $$R_B = R_S \times (I_{TRIP}/I_{IMBALANCE})$$

where $I_{TRIP}$ is the current in the circuit (i.e., the load) at which the GFI is intended to trip to provide overcurrent protection, and, as defined above, $I_{IMBALANCE}$ is the current imbalance which will trip the GFI. This relationship assumes a negligible voltage drop across the (current transformer in the) GFI.

This arrangement provides overcurrent protection, but, because it results in some current imbalance in the GFI under normal circuit operation, it also causes some change in the ground fault current which will trip the GFI. For example, if the GFI circuit trips at a current imbalance, $I_{IMBALANCE}$, of 5 ma, and the ratio of $R_B/R_S$ is 2000, then, from the equation above, the arrangement will trip at a circuit current, $I_{TRIP}$, of 2000×5 ma, or 10 amps. However, if, for example, a current in the circuit is 5 amps, then the current in $R_B$ is 2.5 ma, and a ground fault between the line sense point and the return sense point of only 2.5 ma would trip the GFI circuit.

In order to eliminate or reduce the extent of any change in the ground fault current which will trip the GFI due to the presence of the components required by the invention, it is therefore often preferred that: 1) the first control element has an impedance which is a non-linear function of current; or/and 2) the first bypass component has an impedance which is a non-linear function of voltage.

Copending, commonly assigned U.S. patent application Ser. No. 60/003,733 (docket number MP1559-US1) discloses overcurrent protection circuits employing a GFI arranged with a first control element such as a positive temperature coefficient (PTC) device having an impedance which is a non-linear function of current, and is particularly useful in circuit protection systems which could be subject to particularly high overcurrent conditions. A preferred example of a first embodiment of this invention comprises a GFI arranged with a parallel component having an impedance which is a non-linear function of voltage.

The current through the first bypass component, $I_{FIRST-BYPASS}$ (which results in a corresponding current imbalance in the GFI, $I_{GFI}$), remains low until the current in the line, $I_{LINE}$, is close to the current, $I_{FIRST-TRIP}$, which will cause the GFI to trip. This is desirable to ensure that the first bypass component does not have any substantial effect on the electrical characteristics of the circuit under normal operating conditions, but reacts rapidly to an overcurrent. Thus, $I_{FIRST-BYPASS}$ is preferably less than $0.10 \times I_{IMBALANCE}$ when $I_{LINE}$ is $0.90 \times I_{FIRST-TRIP}$, particularly when $I_{LINE}$ is $0.95 \times I_{FIRST-TRIP}$, especially when $I_{LINE}$ is $0.99 \times I_{FIRST-TRIP}$. Yet better performance results when $I_{FIRST-BYPASS}$ is less than $0.01 \times I_{IMBALANCE}$, especially less than $0.001 \times I_{IMBALANCE}$ when $I_{LINE}$ is $0.95 \times I_{FIRST-TRIP}$, particularly when $I_{LINE}$ is $0.99 \times I_{FIRST-TRIP}$.

As noted above, preferably the first bypass component and/or the first control element has a non-linear characteristic such that the current through the bypass element undergoes a corresponding non-linear change in response to an increase in $I_{LINE}$ over a particular value. This can be achieved through the use of one or a combination of expedients. These expedients include, without limitation:

a) The first control element comprises a series resistor and the first bypass component comprises a diode. The current in the circuit results in a voltage across the series resistor which is impressed across the diode. The diode conducts when the voltage exceeds the forward voltage of the diode. Since a GFI circuit may be set to trip on one of the positive half cycle and the negative half cycle of the sinusoidal current, two diodes may be used, with the diodes connected in parallel and their respective polarities reversed.

b) The first control element comprises a series resistor and the first bypass component comprises two Zener diodes connected in series, "back to back," i.e., anode to anode or cathode to cathode. The Zener diodes conduct when the voltage exceeds the Zener breakdown voltage of the diodes.

c) The first control element comprises a series resistor and the first bypass component comprises a varistor. The current in the circuit results in a voltage across the series resistor which is impressed across the varistor. The varistor conducts when the voltage exceeds the switching voltage of the varistor.

d) The first control element comprises an inductor and the first bypass component comprises a bypass resistor. The impedance of the inductor increases in response to a rapid increase in current, thereby impressing an increased voltage across the bypass resistor and causing an imbalance current to pass through the bypass resistor. This combination has a limitation in that the inductor would not respond to an overcurrent resulting from a slow rate of increase in the current.

e) The first control element comprises a series resistor and the first bypass component comprises a capacitor. A rapid change in the circuit current would result in a rapidly changing voltage across the series resistor. The impedance of the capacitor decreases in response to the rapidly changing voltage, causing an imbalance current to flow through the capacitor. This combination also has a limitation that it would not respond to an overcurrent resulting from a slow rate of increase in the current.

f) The first control element comprises a semiconductor switching device, and the first bypass component comprises a bypass resistor, with the switching device configured to sense the current level and divert current to the bypass resistor when the current in the circuit exceeds a predetermined level.

g) The first control element comprises a PTC device, and the first bypass component comprises a bypass resistor. An overcurrent in the circuit causes the PTC device to heat and its resistance to increase, thereby diverting current to the bypass resistor. This arrangement is disclosed in U.S. patent application Ser. No. 60/003, 733 (docket number MP1559-US1).

In the expedients described above which do not include a resistor in the first bypass component, there is a possibility that an extreme overcurrent, e.g. one resulting from a short circuit across the load, could damage the device(s) comprising the first bypass component. Therefore, it is preferred that the first bypass component also comprises a current-limiting resistor connected in series with the device(s) described above.

A second embodiment of the invention provides additional overcurrent protection, in particular protection against very high overcurrents. The second embodiment of the invention comprises a second control element connected in series with the common input to the first control element and first bypass element, and a second bypass element which is connected so that it spans both the second control element and the first bypass element. In this embodiment, the second control element is selected so that it has a very low impedance when the circuit current is normal, and rapidly changes to a very high impedance if the operating circuit is exposed to a very high overcurrent, e.g. a short circuit. When the impedance of the second control element becomes high, current is diverted through the second bypass element, thereby causing a current imbalance in the comparison element.

In a third embodiment of the invention, which provides overvoltage protection, the first bypass element of the system again comprises a single bypass component, but one which is connected (1) between the line sense input and the return sense input, (2) between the line sense output and the return sense output, (3) between the line sense input and the return sense output and comprises a passthru line, or (4) between the line sense output and the return sense input and comprises a passthru line. Such a bypass component is referred to herein as a second bypass component. In this third embodiment of the invention, the second bypass component is selected so that the current through it, $I_{SECOND-BYPASS}$, increases if the operating circuit is exposed to an overvoltage.

In the third embodiment of the invention, in order to use a GFI for overvoltage protection, and to do so without substantially changing the ground fault interrupt performance of the GFI, it is preferred that the second bypass component has an impedance which is a non-linear function of voltage. In this embodiment it is therefore preferred that the current through the second bypass component, $I_{SECOND-BYPASS}$ (which results in a corresponding current imbalance in the GFI, $I_{GFI}$), remains low until the voltage across the circuit, $V_{CIRCUIT}$, is close to a voltage, $V_{SECOND-TRIP}$, where $V_{SECOND-TRIP}$ is the voltage which will cause $I_{SECOND-BYPASS}$ to increase to a value $I_{IMBALANCE}$, which will cause the GFI to trip. This is desirable to ensure that the second bypass component does not have any substantial effect on the electrical characteristics of the circuit under normal operating conditions, but reacts rapidly to an overvoltage. Thus, $I_{SECOND-BYPASS}$ is preferably less than $0.10 \times I_{IMBALANCE}$ when $V_{CIRCUIT}$ is $0.90 \times V_{SECOND-TRIP}$, particularly when $V_{CIRCUIT}$ is $0.95 \times V_{SECOND-TRIP}$, especially when $V_{CIRCUIT}$ is $0.99 \times V_{SECOND-TRIP}$. Yet better performance results when $I_{SECOND-BYPASS}$ is less than $0.01 \times I_{IMBALANCE}$, especially less than $0.001 \times I_{IMBALANCE}$ when $V_{CIRCUIT}$ is $0.95 \times V_{SECOND-TRIP}$, particularly when $V_{CIRCUIT}$ is $0.99 \times V_{SECOND-TRIP}$.

As noted above, preferably the second bypass component has a non-linear characteristic such that the current through the first bypass element undergoes a corresponding non-linear change in response to an increase in $V_{CIRCUIT}$ over a particular value. The second bypass component can comprise, for example, a voltage foldback or clamping device such as a varistor, a diode, a Zener diode, a gas discharge tube or a spark gap.

In a fourth embodiment of the invention, which provides overcurrent (or undercurrent) protection, the first bypass element of the system again comprises a second bypass component which is connected (1) between the line sense input and the return sense input, (2) between the line sense output and the return sense output, (3) between the line sense input and the return sense output and comprises a passthru line, or (4) between the line sense output and the return sense input and comprises a passthru line. However, in this fourth embodiment, the second bypass component comprises a switching device, and the system comprises a first control element which is connected in the line (or return line) of the operating circuit. The first control element is a current-responsive component and is coupled with the switching device. The current-responsive component is selected so that, when $I_{LINE}$ is a normal value, the current-responsive component causes the switching device to remain in an open state, and when $I_{LINE}$ exceeds (or, for undercurrent protection, falls below) a predetermined value $I_{SECOND-TRIP}$, the current responsive device causes the switching device to change to a closed state.

As noted in regard to the first, second and third embodiments of the invention discussed above, components comprising at least one of the first bypass and first control elements preferably have non-linear characteristics such that the current through the first bypass element undergoes a non-linear change in response to an overcurrent and/or overvoltage in the circuit. In the fourth embodiment of the invention, the second bypass component achieves the preferred non-linearity through the use of the switching device. Such switching devices may include electromechanical devices, e.g. relays, and solid state switching arrangements, which, like the preferred arrangements of the first, second and third embodiments, result in a non-linear response.

A fifth embodiment of the invention provides additional overcurrent protection, again in particular against very high overcurrents, e.g. short circuits. The fifth embodiment of the invention comprises a second control element connected in series with the line side of the comparison element, and a second bypass element which is connected so that it spans both the second control element and the line side of the comparison element. The second control element and second bypass element function in the same manner as the respective corresponding elements function in the second embodiment of the invention described above. One purpose of including the second control element and second bypass element is to protect the components in the first control element from a very high overcurrent, such as would result from a short circuit at the load.

A sixth embodiment of the invention provides overvoltage protection. The sixth embodiment of the invention comprises a first control element connected between the line side and return side, in parallel with the load. Similar to the fourth embodiment of the invention, the first bypass element comprises a second bypass component which is connected (1) between the line sense input and the return sense input, (2) between the line sense output and the return sense output, (3) between the line sense input and the return sense output and comprises a passthru line, or (4) between the line sense output and the return sense input and comprises a passthru line. As in the fourth embodiment, the second bypass component comprises a switching device. The first control element is a voltage-responsive component and is coupled with the switching device. The voltage-responsive component is selected so that, when the voltage across the load, $V_{LOAD}$, is a normal value, the voltage-responsive component causes the switching device to remain in an open state, and when the voltage across the load exceeds a predetermined value, $V_{SECOND-TRIP}$, the voltage responsive device causes the switching device to change to a closed state.

A prior art circuit including a conventional GFI device is shown in FIG. 1. To simplify description of the circuits in subsequent FIGs., the components comprising the GFI device, except for a first set of contacts 14 and second set of contacts 16, are shown within the dotted lines, are referred to as the GFI circuit, and are given the general reference character 10. In a conventional GFI device, line 8 and return 6 currents flow in opposite directions in two primary windings 32 24 of a GFI transformer 28. If the line 8 and return 6 currents are equal, the resulting magnetic field in the GFI transformer 28 is zero and the induced current in a secondary winding 26 is essentially zero. If the line 8 and return 6 currents are not equal, for example in the case of a ground fault from the line 8 to ground 12, then the imbalanced currents cause a magnetic field in the GFI transformer 28. If the current imbalance exceeds a first established threshold, the resulting magnetic field in the GFI transformer 28 causes an induced current in the secondary winding 26 to exceed a second established threshold. A detection circuit 22 determines that the induced current in the secondary winding 26 exceeds the second established threshold and energizes a latching relay 18 (or deenergizes an active relay). When the latching relay 18 is energized, the normally closed contacts 14 16 are opened thereby removing the power applied to a load 4. The contacts 14 16 remain open until they are manually reset to the closed position.

In one class of ground fault interrupters, the imbalance between the line 8 and return 6 currents required to trip a GFI is typically 5 milliamps (ma). In typical implementations of GFI circuits for AC applications, the detection circuit 22 will sense the current imbalance level only during either the positive or negative half-cycle, for example by charging a capacitor during one half-cycle and allowing the capacitor to discharge during the other half-cycle. Due to variability in the manufacturing process, it may not be possible to predict, without expensive testing, during which half-cycle a particular GFI device will sense the current imbalance level.

Figure 2:
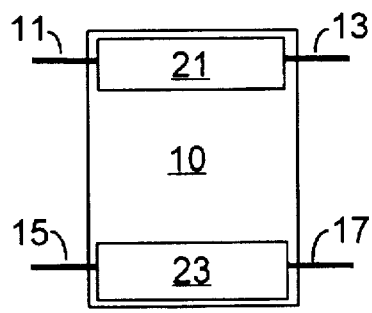
FIG. 2 is a block diagram representing a known GFI circuit.

FIG. 2 shows the GFI circuit 10 with its respective inputs and outputs. As described herein, the GFI circuit 10 has a line path 21 which comprises a line path input 11 and a line path output 13. The GFI circuit 10 also has a return path 23 which comprises a return path input 17 and a return path output 15. Power is applied across the line path input 11 and return path output 15, and the load is connected across the line path output 13 and return path input 17. The line path 21 refers to that portion of the GFI circuit 10 which senses the current level in the line 8, and the return path 23 refers to that portion of the GFI circuit 10 which senses the current level in the return line 6.

Figure 3:
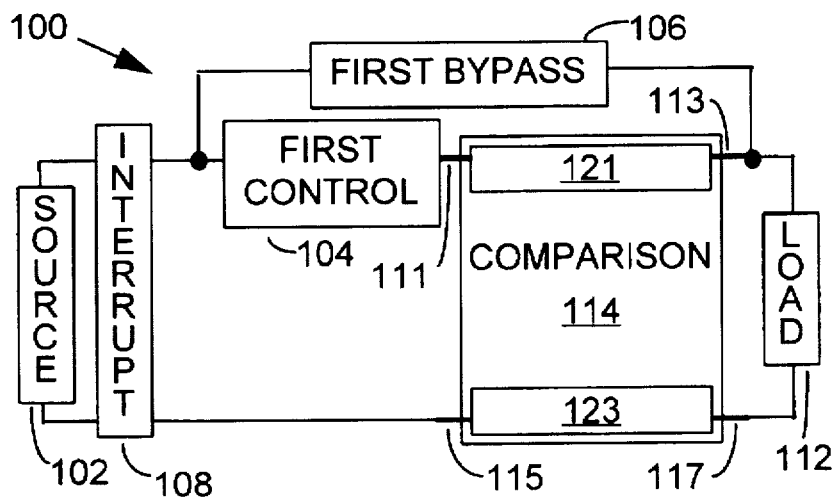
FIG. 3 is a block diagram of a circuit using the first embodiment of the invention.

FIG. 3 shows a block diagram depicting a circuit 100 operational elements of a first embodiment of a circuit protection system of this invention, which embodiment provides overcurrent protection. The operational elements represent the functions performed by the electrical components comprising the protection system. The source 102 provides the electrical power to the circuit, and the load 112 performs the intended purpose of the circuit. The first control 104, first bypass 106, comparison 114 and interrupt 108 elements work cooperatively to provide the overcurrent protection. In an overcurrent situation, the first control element 104 diverts current to the first bypass element 106, thereby creating an imbalance (between the line and return currents) to be detected by the comparison element 114. When the current diverted to the first bypass element 106 reaches an established threshold, the comparison element 114 communicates with the interrupt element 108 causing the interrupt element 108 to reduce or stop the flow of current delivered to the load 112. Analogous to the description of the GFI circuit 10 in FIG. 2, the comparison element 114 has a line sense 121 which comprises a line sense input 111 and a line sense output 113, and a return sense 123 which comprises a return sense input 117 and a return sense output 115.

As described herein, there lies a point, located within the line sense 121, between the line sense input 111 and the line sense output 113, which is referred to herein as the line sense point; and there lies a point, located within the return sense 123, between the return sense input 117 and the return sense output 115, which is referred to as the return sense point.

Figure 4:
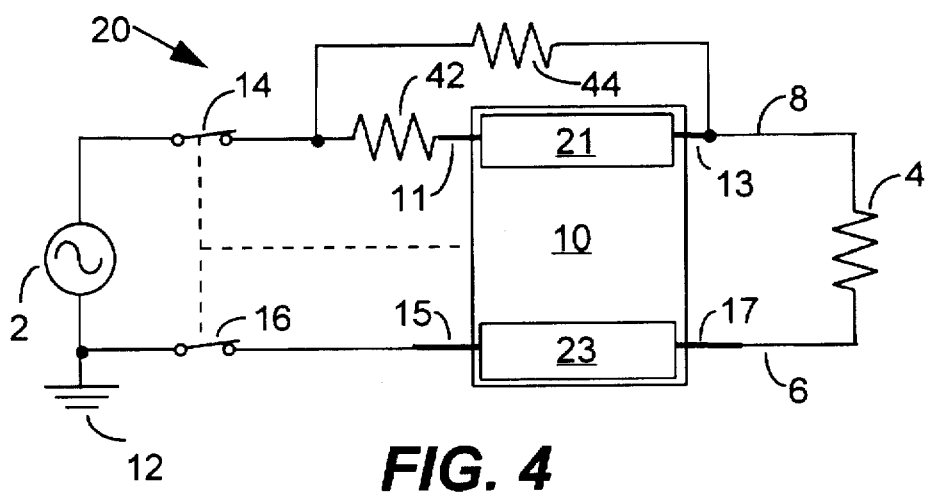
FIGS. 4, 5 and 6 are examples of the circuits of FIG. 3.

The circuit in FIG. 4 is a less preferred example of a first embodiment of the invention, employing an arrangement of a GFI circuit 10 with a first, series resistor ($R_S$) 42, and a second, bypass resistor ($R_P$) 44. This circuit 20 provides overcurrent protection, but with some change in the ground fault current which will trip the GFI. The current imbalance at which the GFI circuit 10 will trip can be set precisely by selecting the values of $R_S$ 42 and $R_P$ 44. As described above, for example, if the GFI circuit 10 trips at a current imbalance of 5 ma, and the ratio of $R_P/R_S$ is 2000, then the system will trip at a circuit current of 2000×5 ma, or 10 amps. However, if, for example, a normal current in the circuit is 5 amps, then the current in $R_P$ 44 is 2.5 ma, and a line 8 fault to ground of only 2.5 ma would trip the GFI circuit 10.

Figure 5:
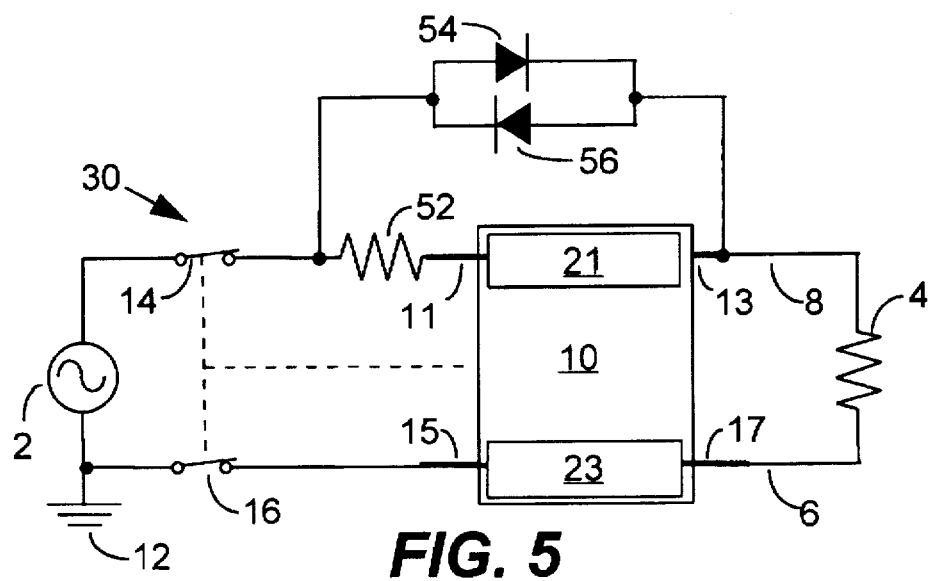

A preferred example of a first embodiment of a GFI circuit protection system in accordance with this invention is shown in FIG. 5. In the circuit 30, a series resistor 52 is series connected in the line between the power supply 2 and the line path input 11 of the GFI circuit 10. A first diode 54 and a second diode 56 are connected in parallel with the series combination of the series resistor 52 and the line path 21 of the GFI circuit 10. The first and second diodes 54 56 are connected with their respective polarities reversed to account for the uncertainty of the particular half-cycle during which the GFI circuit 10 senses the current imbalance. In the remaining description of the circuit of FIG. 5, it is assumed that the GFI circuit 10 senses the current imbalance during the positive half-cycle, and that the first diode 54 is the operative diode in the arrangement. The series resistor 52 has a very low resistance, which is selected so that as long as the voltage across the series resistor 52 is less than the forward voltage of the first diode 54, very little current will flow through the first diode 54, and there will be very little current imbalance between the line 8 and the return 6. When the voltage across the series resistor 52 reaches the forward voltage of the first diode 54, the first diode 54 conducts and the GFI circuit 10 trips, opening the contacts 14 16. For example, for a series resistor 52 having a resistance of 0.05Ω, and a first diode 54 having a forward voltage of 0.5 volts, the GFI circuit 10 would trip if the current in the circuit 10 reached 10 amps. Other components having similar non-linear characteristics, such as Zener diodes, varistors, transistors, or other solid state devices could be used in place of the first and second diodes 54 56.

In the above description, again referring to FIGS. 3 and 5, the first control element 104, and the series resistor 52 it comprises, are shown as being separate from the comparison element 114. The function of the first control element 104, and hence the series resistor 52 in the circuit is to impress a voltage across the first bypass element 106, which voltage is representative of the current in the circuit. The function of the first control element 104 may, of course, be accomplished by a similar component, e.g. a resistor, residing in the comparison element 114. In addition, the components comprising the first control element 104 and first bypass element 106, i.e. the series resistor 52 and diodes 54 56, respectively, are shown configured about the line path 21 of the GFI circuit 10. In accordance with this invention, the first control element 104 and first bypass element 106 may be similarly configured about the return path 23 of the GFI circuit 10. However, in practice, it is preferred to connect to a current-carrying line 8 rather than a return 6 line of a GFI circuit 10.

Figure 6:
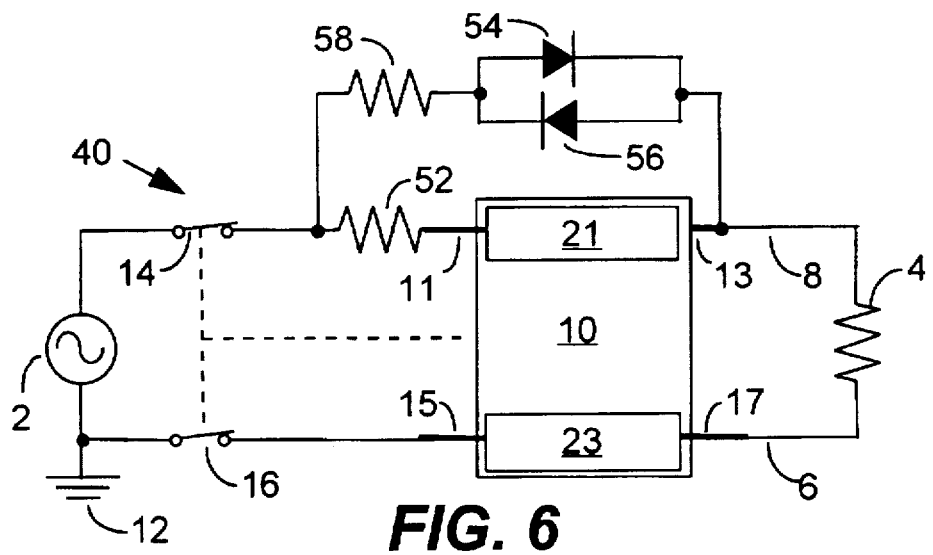

The preferred example of the first embodiment of a GFI circuit protection system in accordance with the invention described above is well suited for applications which require protection from modest overcurrents, e.g. overcurrents on the order of up to several times the normal circuit current. However, for protection from extreme overcurrents, e.g. a short across the load, under certain circumstances there is a potential to draw a very high current through the diode(s) 54 56 or other non-linear devices in the first bypass element 106 before the GFI contacts 14 16 open, and cause the diode(s) 54 56 or other non-linear device(s) in the first bypass element 106 to fail. Therefore, as shown in FIG. 6, it is preferred to add a current-limiting resistor 58 in series with the diode(s) 54 56 or other non-linear device(s).

Figure 7:
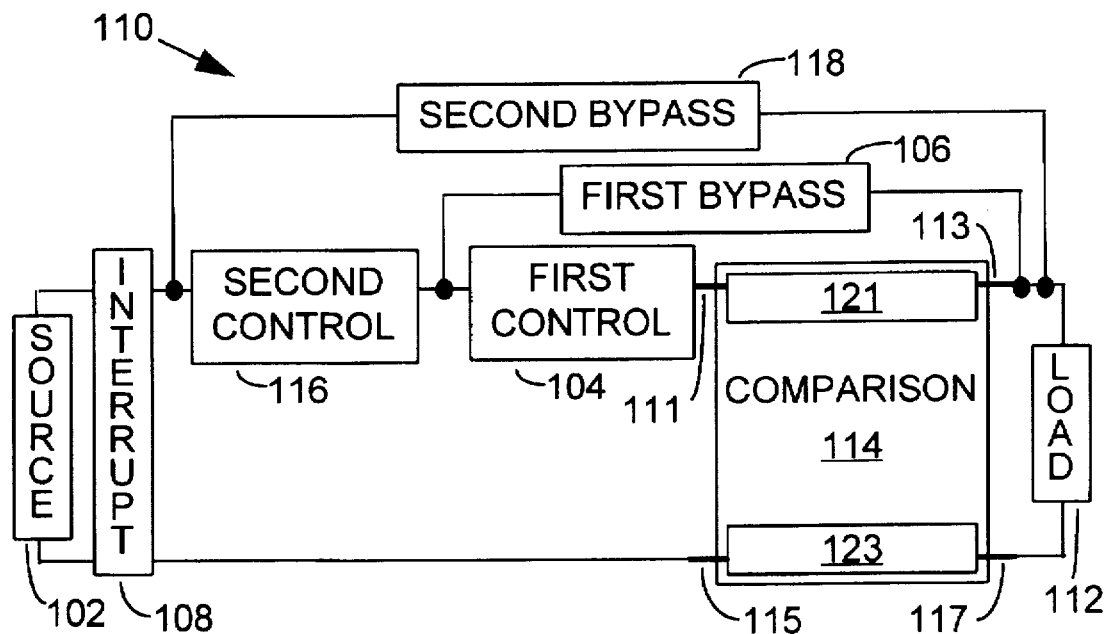
FIG. 7 is a block diagram of a circuit using the second embodiment of the invention.

FIG. 7 shows a block diagram depicting a circuit 110 comprising operational elements of a second embodiment of a circuit protection system of this invention, which embodiment provides overcurrent protection. The operational elements in this second embodiment include the operational elements of the first embodiment depicted in FIG. 3, with two additional elements: a second control element 116, connected between the interrupt element 108 and the first control element 104; and a second bypass element 118, which spans the second control element 116 and the first bypass element 106. The purpose of the second control element 116 and second bypass element 118 is to provide additional protection against very high overcurrents, e.g. short circuit, especially in circumstances where the comparison element 114 may be re-set one or more times while the load is still shorted.

In this embodiment, the second control element 116 is selected so that it has a very low impedance when the current in the circuit is normal, and rapidly changes to a very high impedance in response to a very high overcurrent. When the impedance of the second control element 116 becomes high, current is diverted through the second bypass element 118, causing a current imbalance, which imbalance is detected by the comparison element 114.

Figure 8:
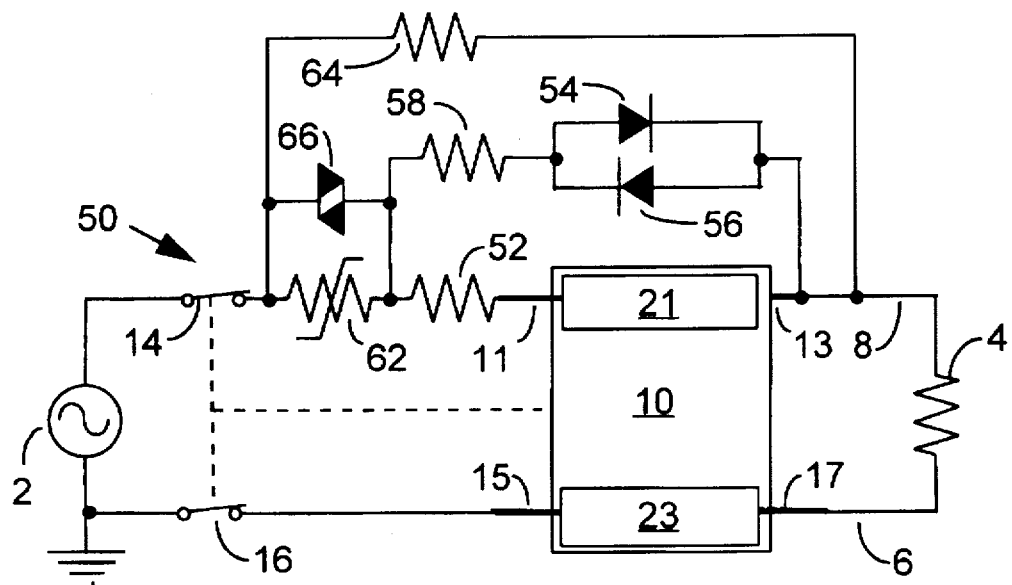
FIG. 8 is an example of a circuit of FIG. 7.

An example of the second embodiment of a GFI circuit protection system in accordance with the invention is shown in FIG. 8. The electrical components in the circuit 50 include all the components shown in the circuit 40 of FIG. 6, with three additional components. A positive temperature coefficient (PTC) device 62 is connected in the line preceding the common juncture of the series resistor 52 and the current-limiting resistor 58. A second bypass resistor 64 is connected from the input side of the PTC device 62 to the common juncture of the parallel, reversed-polarity diodes 54 56 and line-side output 13 of the GFI 10. A varistor 66 is connected in parallel with the PTC device 62.

The operation of the components shown in the circuit 50 of FIG. 8 is the same as is described above for the operations of the components shown in FIG. 6. The purpose of the PTC device 62 and second bypass resistor 64 is to provide additional protection, particularly from very high overcurrents, e.g. a short circuit at the load 4. The operation of the PTC device 62 and second bypass resistor 64 is as described in U.S. patent application Ser. No. 60/003,733 (docket number MP1559-US1). Under normal circuit operating conditions, the resistance of the PTC device 62 is very low, and the resistance of the second bypass resistor is much higher than that of the PTC device 62. Therefore, the circuit current flows through the PTC device 62 toward the load 4. However, in the case of an overcurrent, the resistance of the PTC device 62 increases substantially, and the ratio of the resistance of the PTC device 62 to the resistance of the second bypass resistor 64 becomes such that current is diverted through the second bypass resistor creating a current imbalance in the GFI circuit 10. The varistor 66 connected in parallel with the PTC device 62 limits the magnitude of voltage spikes across the PTC device 62, which voltage spikes can result from a rapid change in the current when the resistance of the PTC device 62 increases and in the presence of an inductive load 4 and/or inductive components in the circuit.

The values of the components may be selected so that the series resistor 52 and diodes 54 56 trip the GFI circuit 10 on overcurrents of a few times the normal circuit current, or more, and the PTC device 62 and second bypass resistor will trip the GFI circuit 10 only on very high overcurrents. In one example circuit, components with the following values were used: 0.5Ω series resistor 52, 10Ω current limiting resistor 58, 8.2KΩ second bypass resistor 64, 0.5 volt forward voltage diodes 54 56, and a PTC device 62 which trips to its high impedance state at 2 amps. With the 0.5Ω series resistor 52 and diodes 54 56 which conduct at 0.5 volts, the GFI circuit 10 trips at 1 amp. In case of a short circuit, the current through the diodes 54 56 would be limited to about 10 amp by the current limiting resistor 58, however, the current through the GFI circuit could be about 150 amps. However, the PTC device 62 would quickly trip and divert current through the second bypass resistor 64, thereby, as described in U.S. patent application Ser. No. 60/003,733 (docket number MP1559-US1), limiting the fault current in the process. Note that in the event that there is a continuing fault, such as a short circuit, and the PCT circuit 10 is manually reset while the GFI device 62 is at an increased temperature and hence in its high resistance state, current would continue to be diverted through the second bypass resistor 64, and cause the GFI circuit 10 to continue to trip.

Figure 9:
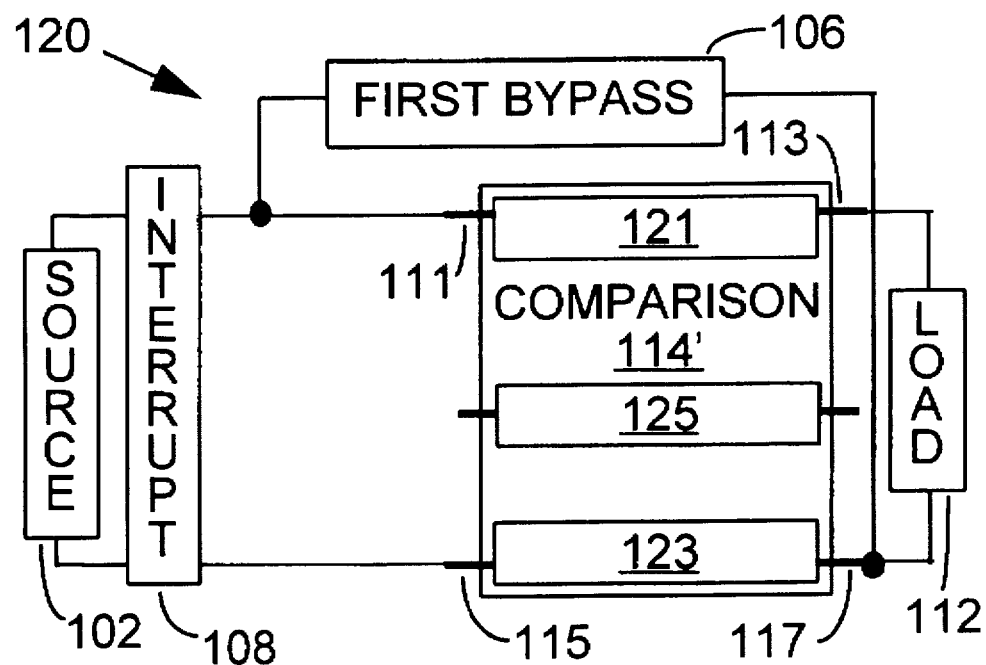
FIG. 9 is a block diagram of a circuit using the third embodiment of the invention.

FIG. 9 shows a block diagram depicting a circuit 120 comprising operational elements of a third embodiment of a circuit protection system of this invention, which embodiment provides overvoltage protection. The diagram of FIG. 9 differs from the diagram of FIG. 3 in that there is no first control element 104, and a first bypass element 106 is shown connected between the line sense input 111 and return sense input 117 of the comparison element 114'. Also, the comparison element 114' is shown comprising a passthru sense 125. In an overvoltage situation, the bypass element 106 passes current, thereby creating a current imbalance to be detected by the comparison element 114'. When the current imbalance reaches the established threshold, the comparison element 114' communicates with the interrupt element 108 causing the interrupt element 108 to reduce or stop the flow of current delivered to the load 112. FIG. 9 shows the first bypass element 106 connected between the line sense input 111 and return sense input 117 of the comparison element 114'. The system provides overvoltage protection with the first bypass element 106 connected between the line sense input 111 and the return sense input 117 of the comparison element 114', or between the line sense output 113 and the return sense output 115 of the comparison element 114'. In addition, the system provides overvoltage protection with the first bypass element 106 connected between the line sense input 111 and the return sense output 115 of the comparison element 114', or between the line sense output 113 and the return sense input 117 of the comparison element 114', with, in either case, the first bypass element connection comprising the passthru sense 125. The function of the passthru sense 125 will be explained below with reference to FIGS. 10 and 11a–11d.

Figure 10:
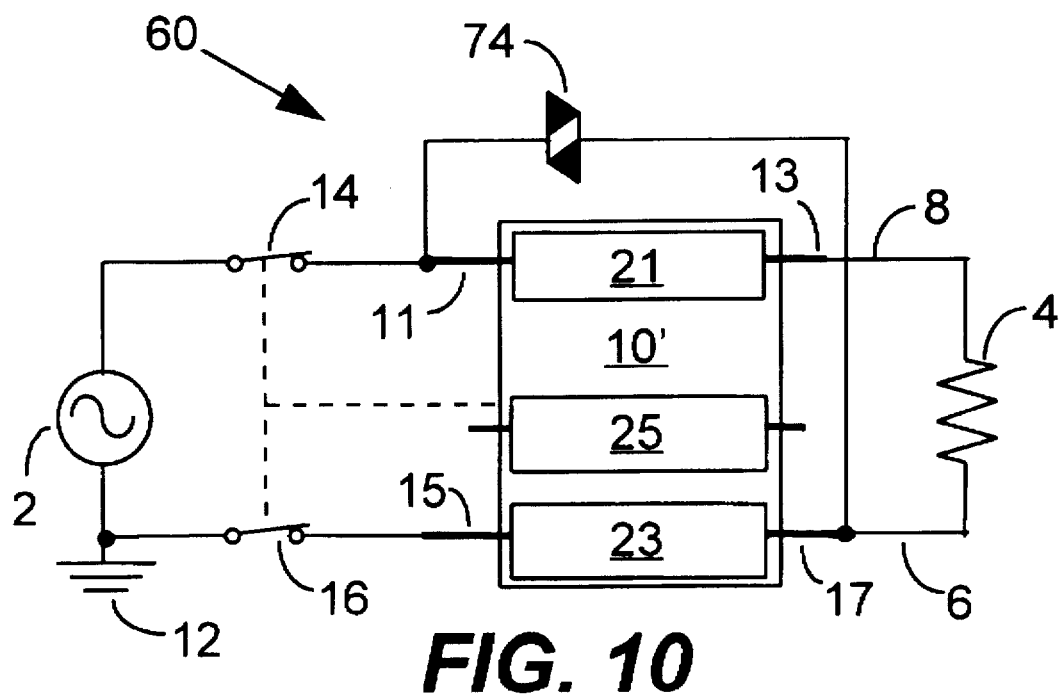
FIG. 10 is an example of a circuit of FIG. 9.
Figure 11A:
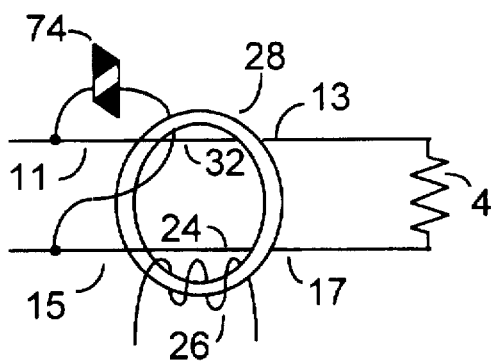
FIGS. 11a, 11b, 11c and 11d are circuit diagrams indicating different variations of a portion of the circuit shown in FIG. 10.
Figure 11B:
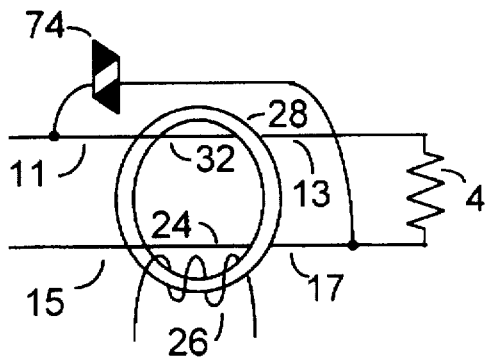
Figure 11C:
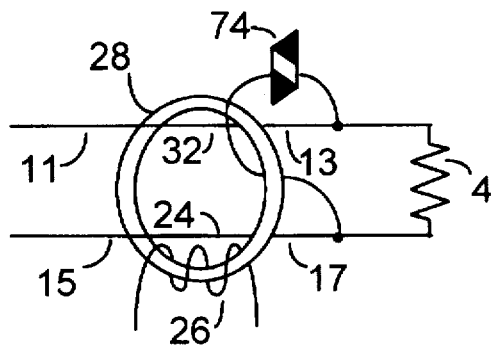
Figure 11D:
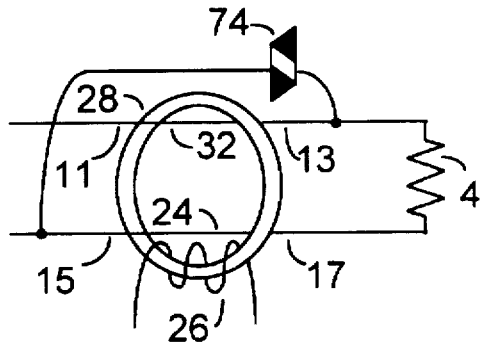

An example of a third embodiment of a GFI circuit protection system in accordance with this invention is shown in FIG. 10. In the circuit 60, a varistor 74 is connected between the line path input 11 and the return path input 17 of the GFI circuit 10'. At normal circuit voltages, the varistor 74 conducts a negligible amount of current. When an overvoltage occurs, the varistor 74 begins to conduct, thereby creating an imbalance in the GFI circuit 10'. If the current imbalance reaches the trip level, e.g. 5 ma, the GFI circuit 10' trips causing the contacts 14 16 to open. As mentioned above, this system provides overvoltage protection with the varistor 74, i.e. the first bypass element 106, connected in one of four arrangements. FIGS. 11a, 11b, 11c and 11d are circuit diagrams showing the four arrangements. The reference numerals for the components shown in the circuit diagrams of FIGS. 11a–11d are the same reference numerals for the corresponding components shown in the circuit diagrams of FIGS. 1 and 10. The GFI transformer 28 is shown as a ring, with the primary windings 32 24 passing through the GFI transformer 28. The secondary winding 26 is shown wound around the GFI transformer 28. The varistor 74 is shown connected in the following arrangements: 1) in FIG. 11a, between the line path input 11 and the return path output 15; 2) in FIG. 11b, between the line path input 11 and the return path input 17; 3) in FIG. 11c, between the line path output 13 and the return path input 17; and 4) in FIG. 11d, between the line path output 13 and the return path output 15. In FIGS. 11a and 11c, the varistor 74 connection is shown passing through the GFI transformer 28. This is necessary to cause the secondary winding 26 to sense an imbalance current when current flows through the varistor 74. The varistor 74 connection shown in FIGS. 11a and 11c may use the separate test wire in the GFI 10' for this purpose. Referring again to FIGS. 9 and 10, the passthru sense 125 in the comparison element 114' and a passthru path 25 in the GFI circuit 10' represent the connection passing through the GFI transformer 28.

The connections shown in FIGS. 11a–11d show the connections necessary to cause a detected current imbalance in the GFI circuit 10'. In addition, for example, in FIGS. 11b and 11d, the varistor 74 connection may also pass through the transformer 28 to further amplify the current imbalance in the GFI circuit 10'. Also, in all four examples, the varistor 74 connection may be wound around the transformer 28 one or more times to obtain additional amplification of the imbalance current.

It is preferred that a non-linear device, such as a varistor, diode, Zener diode, spark gap, triac, or other device having similar characteristics be employed as the first bypass element 106 in these circuits.

The GFI overvoltage protection systems of this invention may be combined with the GFI overcurrent protection systems of this invention to provide both overcurrent and overvoltage protection in electrical circuits. The GFI overvoltage protection systems of this invention may also be combined with the GFI overcurrent protection systems disclosed in copending, commonly assigned U.S. patent application Ser. No. 60/003,733 (docket number MP1559-US1) to provide both overcurrent and overvoltage protection.

In the circuit arrangements shown in FIGS. 11a–11d, the varistor 74 acts as a switch which is open under normal operating conditions, and which closes upon detection of an overvoltage. While the varistor 74 switches on overvoltage, a similar arrangement can provide overcurrent protection if the varistor is replaced with a switching device which is activated by the detection of an overcurrent condition.

Figure 12:
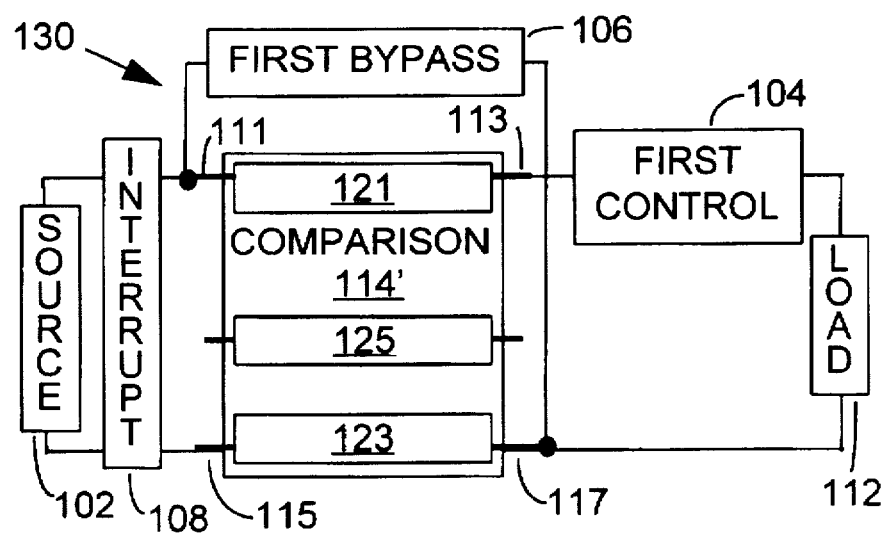
FIG. 12 is a block diagram of a circuit using the fourth embodiment of the invention.

FIG. 12 shows a block diagram depicting a circuit 130 comprising operational elements of a fourth embodiment of a circuit protection system of this invention, which embodiment provides overcurrent protection, and in which the varistor 74 in the overvoltage protection circuit 60 of FIG. 10 is replaced by a switching device to be activated by the detection of an overcurrent condition. The block diagram of FIG. 12 includes the first control element 104 not included in the block diagram of FIG. 9. The first control element 104 is shown in FIG. 12 between the line sense output 113 of the comparison element 114' and the load 112. However, the control element may also be placed between the source 102 and the line sense input 111 of the comparison element 114', preferably between the interrupt element 108 and the line sense input 111. The first control element 104 may also be placed in comparable positions in the return line, however it is preferred not to place components in the return line which would result in a voltage drop in the return line. The first bypass element 106 is shown connected between the line sense input 111 and return sense input 117 of the comparison element 114'. The first bypass element 106 does not pass current during normal operation. In an overcurrent situation, the first control element 104 detects the overcurrent and communicates with the first bypass element 106, causing the first bypass element 106 to pass current, thereby creating a current imbalance to be detected by the comparison element 114'. The comparison element 114' communicates with the interrupt element 108 causing the interrupt element 108 to reduce or stop the flow of current delivered to the load 112. FIG. 9 shows the first bypass element 106 connected between the line sense input 111 and return sense input 117 of the comparison element 114'. As discussed above in reference to FIG. 6, the system provides circuit protection with the first bypass element 106 connected between the line sense input 111 and the return sense input 117 of the comparison element 114', or between the line sense output 113 and the return sense output 115 of the comparison element 114'. In addition, the system provides circuit protection with the first bypass element 106 connected between the line sense input 111 and the return sense output 115 of the comparison element 114', or between the line sense output 113 and the return sense input 117 of the comparison element 114', with, in either case, the first bypass element 106 connected through the passthru sense 125 of the comparison element 114'.

Figure 13:
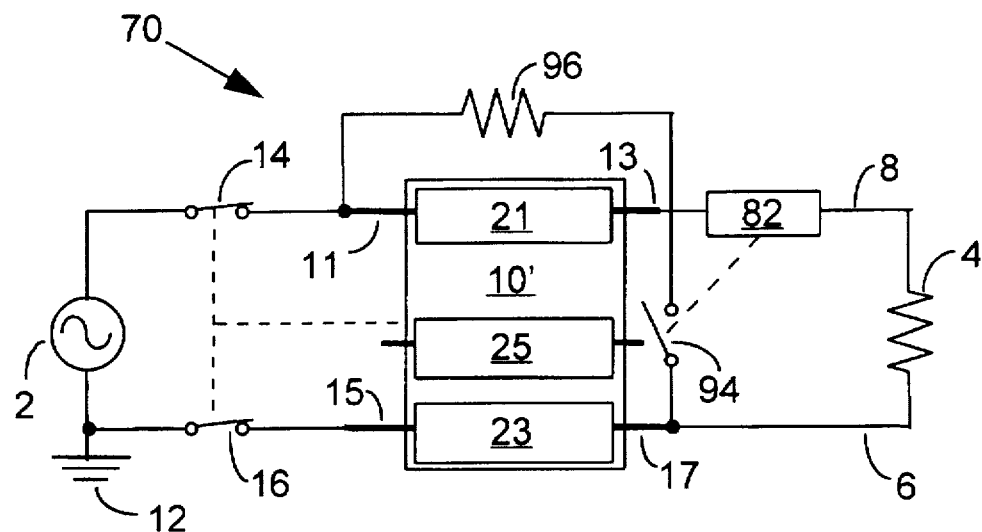
FIG. 13 is an example of a circuit of FIG. 12.

The circuit arrangement shown in FIG. 13 is an example of a fourth embodiment of a GFI protection system in accordance with this invention. In the circuit 70 the current level in the line 8 is sensed by a current-sensing device such as a current-sensing relay coil 82. In case of an overcurrent, the current-sensing relay coil 82 energizes, closing a set of relay contacts 94. A resulting imbalance current, limited by a resistor 96, causes the GFI circuit 10' to trip and open the contacts 14 16. The current-sensing relay coil 82 and relay contacts 94 may be replaced by a solid state current-sensing and switching arrangement.

Figure 14A:
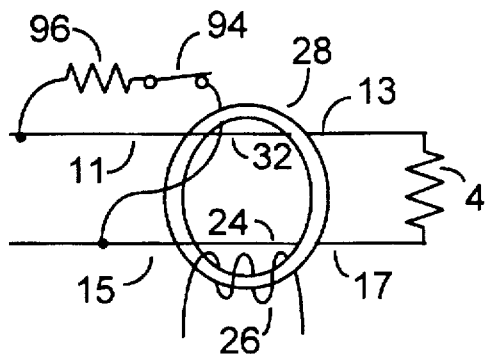
FIGS. 14a, 14b, 14c and 14d are circuit diagrams indicating different variations of a portion of the circuit shown in FIG. 13.
Figure 14B:
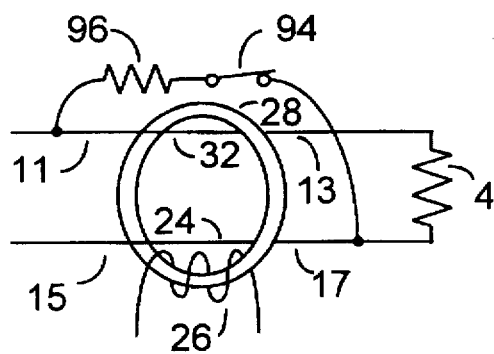
Figure 14C:
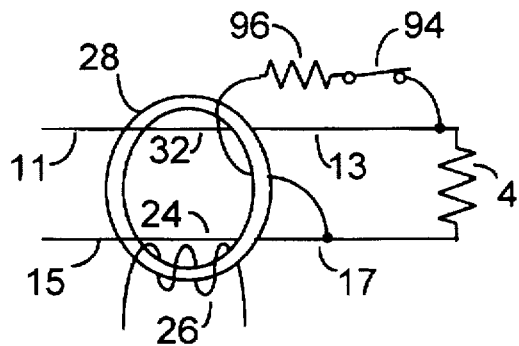
Figure 14D:
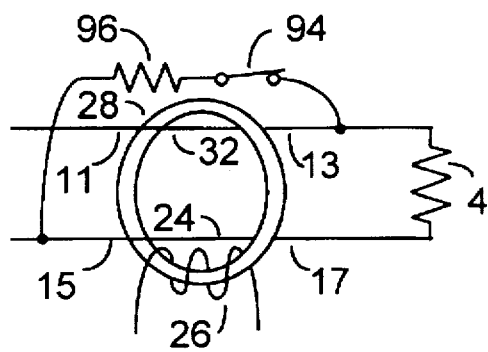

In FIG. 13, the combination including the resistor 96 and relay contacts 94 is shown connected from the line path input 11 to the return path input 17 of the GFI circuit 10'. FIGS. 14a, 14b, 14c and 14d are circuit diagrams showing circuit arrangements analogous to the varistor arrangements shown in FIGS. 11a–11d. The combination of the resistor 96 and relay contacts 94 may be connected: 1) in FIG. 14a, between the line path input 11 and the return path output 15; 2) in FIG. 14b, between the line path input 11 and the return path input 17; in FIG. 14c, between the line path output 13 and the return path input 17; and 4) in FIG. 14d, between the line path output 13 and the return path output 15. In FIGS. 14a and 14c, the connection is shown passing through the GFI transformer 28. As discussed above with regard to the varistor 74 connections in the overvoltage protection circuit 60, all of the connections depicted in FIGS. 14a–14d may be optionally passed through the transformer 28, and/or wound around the transformer 28 one or more times to amplify the current imbalance in the GFI circuit 10'.

Referring again to FIG. 13, the current-sensing relay coil 82 may be located in series in the line 8 or return 6, although it is preferred practice not to include components in the return 6 which may result in a voltage drop in the return 6. The current-sensing relay coil 82 is preferably located between the line path output 13 of the GFI circuit 10' and the load 4, however, it may also be located between the power source 2 and the line path input 11 of the GFI circuit 10', preferably between the first set of contacts 14 and the line path input 11.

This fourth embodiment of the invention can also be used to provide circuit protection in undercurrent situations. For example, the first control element 104 may be set to trigger the first bypass element 106 when the current in the circuit decreases from a value above a trip level to a value below a trip level.

Figure 15:
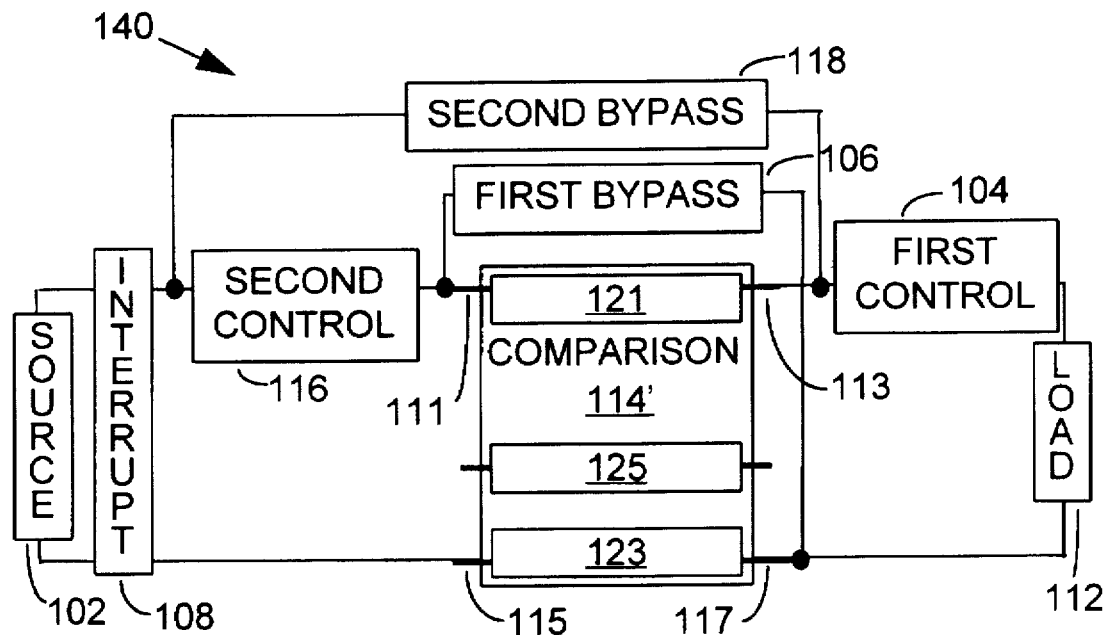
FIG. 15 is a block diagram of a circuit using the fifth embodiment of the invention.

FIG. 15 shows a block diagram depicting a circuit 140 comprising operational elements of a fifth embodiment of a circuit protection system of this invention, which embodiment provides overcurrent protection. The elements depicted in FIG. 15 include all the elements shown in the fourth embodiment in FIG. 12, plus the second control element 116 and second bypass element 118 previously discussed in regard to the second embodiment of the invention shown in FIG. 7.

Thus, the first control 104 element and first bypass 106 element serve to provide protection from moderate overcurrents, while the second control element 116 and second bypass element 118 provide protection from very high overcurrents, e.g. short circuits.

Figure 16:
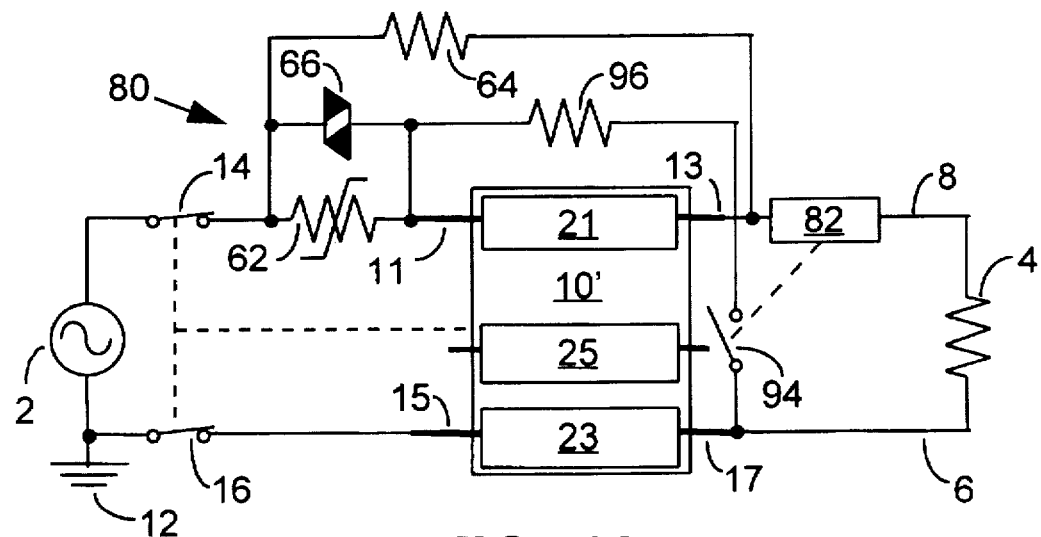
FIG. 16 is an example of a circuit of FIG. 15.

The circuit arrangement shown in FIG. 16 is an example of a fifth embodiment of a GFI protection system in accordance with this invention. This circuit 80 incorporates the components shown in the circuit 70 of FIG. 13, plus the additional components previously discussed in relation to FIG. 8, i.e. the PTC device 62, the second bypass resistor 64, and the varistor 66 connected in parallel with the PTC device 62. The operation of the components included in the circuit 80 is the same as is described for the respective components in regard to FIGS. 8 and 13.

Figure 17:
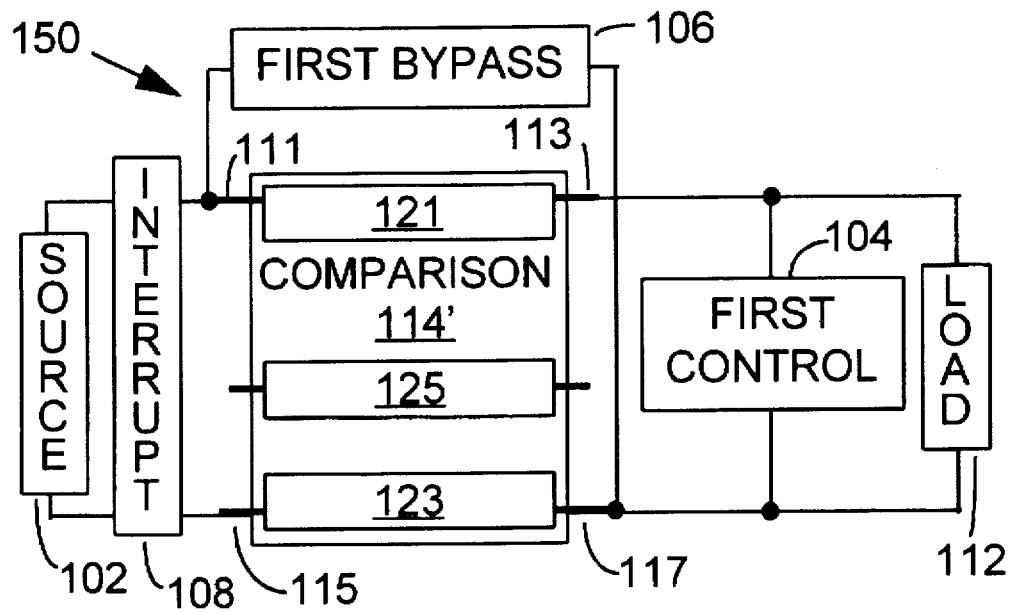
FIG. 17 is a block diagram of a circuit using the sixth embodiment of this invention.

FIG. 17 shows a block diagram depicting a circuit 150 comprising operational elements of a sixth embodiment of a circuit protection system of this invention, which embodiment provides overvoltage protection. In most respects, the operation of this sixth embodiment is very similar to that of the fourth embodiment described above. Therefore, only the differences between the two will be described. Whereas, in the fourth embodiment described above, the first control element 104 comprises a current-sensing device such as a current-sensing relay 82, and is connected in the line 8 (or return line 6) of the circuit, in the sixth embodiment, the first control element 104 comprises a voltage-sensing device which is connected between the line 8 and return line 6. If the first control element 104 detects an overvoltage, the first control element 104 communicates with the first bypass element 106, causing the first bypass element 106 to pass current, thereby creating a current imbalance to be detected by the comparison element 114'.

Figure 18:
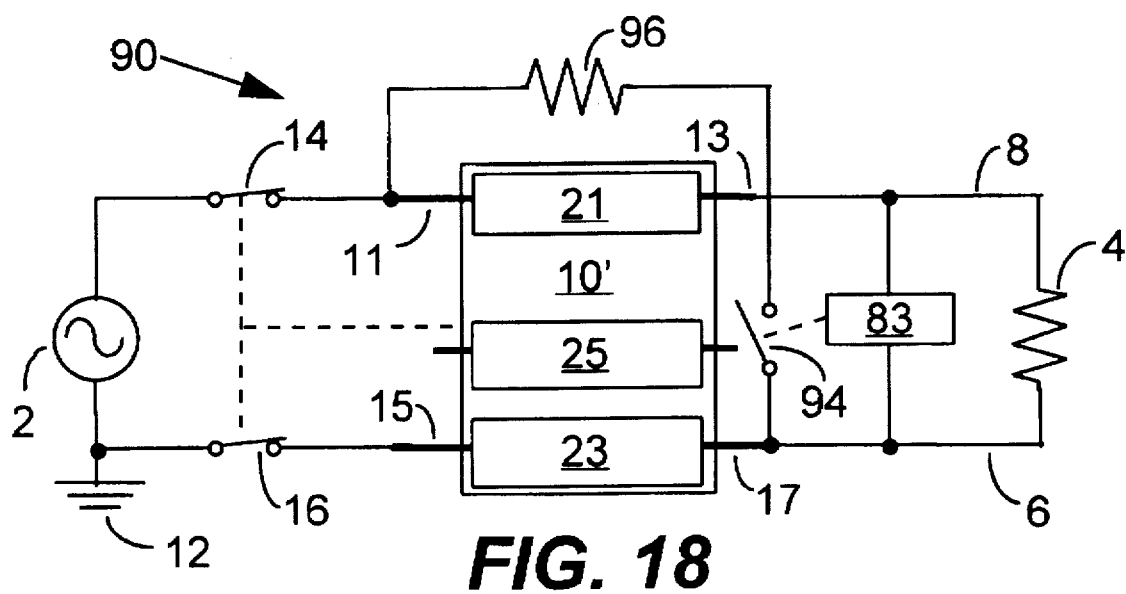
FIG. 18 is an example of a circuit of FIG. 17.

The circuit arrangement shown in FIG. 18 is an example of a sixth embodiment of a GFI protection system in accordance with this invention. In the circuit 90 the voltage difference between the line 8 and return line 6 is sensed by a voltage-sensing device such as a voltage-sensing relay coil 83. In case of an overvoltage, the voltage-sensing relay coil 83 energizes, closing a set of relay contacts 94. A resulting imbalance current, limited by a resistor 96, causes the GFI circuit 10' to trip and open the contacts 14 16. The voltage-sensing relay coil 83 and relay contacts 94 may be replaced by a solid state current sensing and switching arrangement.

What is claimed is:

1. An electrical protection system which can be connected between an electrical power supply and an electrical load to form an operating circuit having a current-carrying line and a return line, and which, when so connected, protects the operating circuit from (A) ground faults and (B) overcurrents and/or overvoltages, which system comprises:

a. a circuit interruption element, which can adopt a normal state which permits the flow of a normal current, $I_{NORMAL}$, in the circuit, or a fault state which permits the flow of at most a reduced current, substantially less than $I_{NORMAL}$, in the circuit;

b. a comparison element, which,
   (1) comprises
      (a) a line sense component which senses the level of a current, $I_{LINE}$, in the current-carrying line of the circuit at a line sense point between a line sense input and a line sense output,
      (b) a return sense component which senses the level of a current, $I_{RETURN}$, in the return line of the circuit at a return sense point between a return sense input and a return sense output, and
      (c) optionally, a passthru sense component which senses the level of a current, $I_{PASSTHRU}$, at a passthru sense point in a passthru line, and (2) determines a net effective current, $I_{COMPARISON}$, by comparing the levels of $I_{LINE}$, $I_{RETURN}$ and, if the comparison element comprises a passthru sense component $I_{PASSTHRU}$, and changes the circuit interruption element from its normal state to its fault state if $I_{COMPARISON}$ increases from a value less than a predetermined current imbalance value, $I_{IMBALANCE}$, to a value more than $I_{IMBALANCE}$; and c. a first bypass element which has a current through it, $I_{FIRST-BYPASS}$, which, when the circuit is subjected to an overcurrent and/or an overvoltage, changes and thus causes $I_{COMPARISON}$ to increase to more than $I_{IMBALANCE}$, thereby causing the comparison element to change the circuit interruption element from its normal state to its fault state.

2. A system according to claim 1, wherein the first bypass element comprises a first bypass component which a. is connected in the operating circuit so that it spans one of the line sense point and the return sense point, but not the other of the line sense point and the return sense point, and is not part of a passthru line; and b. has (1) a reduced-conducting state, in which it permits the flow of a current, $I_{FIRST-BYPASS}$, which is substantially less than $I_{IMBALANCE}$, which state it adopts when a voltage across it, $V_{FIRST-BYPASS}$, is less than a predetermined value $V_{FIRST-TRIP}$, and (2) a conducting state, in which it permits the flow of a current, $I_{FIRST-BYPASS}$, which is greater than $I_{IMBALANCE}$, which state it adopts when $V_{FIRST-BYPASS}$ increases from a value less than $V_{FIRST-TRIP}$ to a value greater than $V_{FIRST-TRIP}$.

3. A system according to claim 2 wherein the first bypass component comprises a non-linear device comprising a first diode comprising an anode and a cathode, and a second diode comprising an anode and a cathode, the first and second diodes being connected in parallel, with the anode of the first diode connected to the cathode of the second diode and the cathode of the first diode connected to the anode of the second diode.

4. A system according to claim 3 wherein the first bypass component comprises a resistor connected in series with the non-linear device.

5. A system according to claim 2, comprising a first control element, which, when the system is so connected, a. (1) when the first bypass component spans the line sense point, is series connected in the current-carrying line within the span of the first bypass component; or (2) when the first bypass component spans the return sense point, is series connected in the return line within the span of the first bypass component; and b. has a voltage across it, $V_{FIRST-CONTROL}$, which (1) is less than $V_{FIRST-TRIP}$ when $I_{LINE}$ is less than a predetermined value $I_{FIRST-TRIP}$, thereby causing the voltage across the first bypass component to be less than $V_{FIRST-TRIP}$, and (2) becomes greater than $V_{FIRST-TRIP}$ when $I_{LINE}$ increases from a value less than $I_{FIRST-TRIP}$ to a value greater than $I_{FIRST-TRIP}$, thereby causing the voltage across the first bypass component to exceed $V_{FIRST-TRIP}$.

6. A system according to claim 5, wherein the first control element comprises a resistor.

7. A system according to claim 5, comprising a. a second control element, which (1) when the system is so connected, (a) when the first control element is series-connected in the current-carrying line, is series connected in the current-carrying line and is not within the span of the first bypass element, or (b) when the first control element is series-connected in the return line, is series connected in the return and is not within the span of the first bypass element, and (2) has a variable resistance which (a) is low compared to the load when the circuit current is the normal current, $I_{NORMAL}$, and (b) increases substantially when the circuit current substantially exceeds the normal current, $I_{NORMAL}$; and b. a second bypass element, which (1) when the system is so connected, is connected so that it spans both the second control element and the first bypass element, and (2) has a resistance such that (a) when the circuit current is $I_{NORMAL}$, the ratio of the resistance of the second bypass element to the resistance of the second control element is such that the current in the second bypass element is substantially less than $I_{IMBALANCE}$, and (b) when the circuit current exceeds $I_{NORMAL}$ by a predetermined current amount, the ratio of the resistance of the second bypass element to the resistance of the second control element is such that the current in the second bypass element exceeds $I_{IMBALANCE}$.

8. A system according to claim 7, wherein the second bypass element comprises a resistor.

9. A system according to claim 7, wherein the second control element comprises a PTC device.

10. A system according to claim 9, wherein the second control element comprises a voltage clamping device connected in parallel with the PTC device.

11. A system according to claim 2, wherein $I_{FIRST-BYPASS}$ is less than $0.10 \times I_{IMBALANCE}$, when $I_{LINE}$ is $0.90 \times I_{FIRST-TRIP}$.

12. A system according to claim 1, wherein the first bypass element comprises a second bypass component which:

a. is connected between the line sense input and the return sense input;

b. is connected between the line sense output and the return sense output;

c. is connected between the line sense input and the return sense output and comprises a passthru line; or d. is connected between the line sense output and the return sense input and comprises a passthru line.

13. A system according to claim 12 wherein the second bypass component comprises a voltage-dependent device which has a current through it, $I_{DEVICE}$, which a. is less than $I_{IMBALANCE}$, when a voltage across the voltage-dependent device, $V_{DEVICE}$, is less than a predetermined value, $V_{SECOND-TRIP}$; and b. becomes greater than $I_{IMBALANCE}$, when $V_{DEVICE}$ increases from a value less than $V_{SECOND-TRIP}$ to a value greater than $V_{SECOND-TRIP}$.

14. A system according to claim 13 wherein the voltage dependent device comprises a voltage clamping or foldback device.

15. A system according to claim 13, wherein $I_{DEVICE}$ is less than $0.10 \times I_{IMBALANCE}$ when $V_{DEVICE}$ is $0.90 \times V_{SECOND-TRIP}$.

19

16. A system according to claim 12, wherein
a. the second bypass component comprises a switching device which has a closed state which permits the flow of a current, $I_{SECOND-BYPASS}$, which is greater than $I_{IMBALANCE}$, and an open state which permits the flow of a reduced current, $I_{SECOND-BYPASS}$, which is substantially less than $I_{IMBALANCE}$; and
b. the system comprises a first control element which, when $I_{LINE}$ is less than a predetermined value $I_{SECOND-TRIP}$, causes the switching device to be in its open state, and when $I_{LINE}$ increases from a value less than $I_{SECOND-TRIP}$ to a value greater than $I_{SECOND-TRIP}$, causes the switching device to switch from its open state to its closed state.

17. A system according to claim 16 wherein
a. the first control element comprises a current responsive component having
  (1) a deenergized state, when $I_{LINE}$ does not exceed $I_{SECOND-TRIP}$,
  (2) an energized state, when $I_{LINE}$ has increased from a value less than $I_{SECOND-TRIP}$ to a value greater than $I_{SECOND-TRIP}$; and
b. the switching device comprises a bypass switch which is coupled with the current responsive component, and which is
  (1) open when the current responsive component is in the deenergized state, and
  (2) closed when the current responsive component is in the energized state.

18. A system according to claim 17 wherein the current responsive component comprises a current-sensing relay coil which is series connected in the current-carrying line or the return line, and the bypass switch comprises a set of relay contacts which are coupled with the current-sensing relay coil.

19. A system according to claim 16 wherein the second bypass component comprises a resistor connected in series with the switching device.

20. A system according to claim 12, comprising
a. a second control element, which
  (1) when the system is so connected, is series connected in the current-carrying line in series with the line-side of the comparison element, and
  (2) has a variable resistance which
    (a) is low compared to the load when the circuit current is the normal current, $I_{NORMAL}$, and
    (b) increases substantially when the circuit current substantially exceeds the normal current, $I_{NORMAL}$; and
b. a second bypass element, which
  (1) when the system is so connected, is connected so that it spans both the second control element and the line-side of the comparison element, and
  (2) has a resistance such that
    (a) when the circuit current is $I_{NORMAL}$, the ratio of the resistance of the second bypass element to the resistance of the second control element is such that the current in the second bypass element is substantially less than $I_{IMBALANCE}$, and
    (b) when the circuit current exceeds $I_{NORMAL}$ by a predetermined current amount, the ratio of the resistance of the second bypass element to the resistance of the second control element is such that the current in the second bypass element exceeds $I_{IMBALANCE}$.

21. A system according to claim 20, wherein the second bypass element comprises a resistor.

20

22. A system according to claim 20, wherein the second control element comprises a PTC device.

23. A system according to claim 22, wherein the second control element comprises a voltage clamping device connected in parallel with the PTC device.

24. A system according to claim 1, wherein the circuit interruption element comprises a first circuit switch which is connected in the current carrying line, and which is closed when the circuit interruption element is in the normal state and open when the circuit interruption element is in the fault state.

25. A system according to claim 24, wherein the circuit interruption element comprises a second circuit switch which is connected in the return line, and which is closed when the circuit interruption element is in the normal state and open when the circuit interruption element is in the fault state.

26. A system according to claim 1 wherein the comparison element comprises a GFI circuit.

27. An electrical circuit comprising a power supply, a load, a current-carrying line, a return line and an electrical protection system which protects the circuit from (A) ground faults and (B) overcurrents and/or overvoltages, which system comprises:
a. a circuit interruption element, which can adopt a normal state which permits the flow of a normal current, $I_{NORMAL}$, in the circuit, or a fault state which permits the flow of at most a reduced current, substantially less than $I_{NORMAL}$, in the circuit;
b. a comparison element which,
  (1) comprises
    (a) a line sense component which senses the level of a current, $I_{LINE}$, in the current-carrying line of the circuit at a line sense point between a line sense input and a line sense output,
    (b) a return sense component which senses the level of a current, $I_{RETURN}$, in the return line of the circuit at a return sense point between a return sense input and a return sense output, and
    (c) optionally, a passthru sense component which senses the level of a current, $I_{PASSTHRU}$, at a passthru sense point in a passthru line, and
  (2) determines a net effective current, $I_{COMPARISON}$, by comparing the levels of $I_{LINE}$, $I_{RETURN}$ and, if the comparison element comprises a passthru sense component, $I_{PASSTHRU}$, and changes the circuit interruption element from its normal state to its fault state if $I_{COMPARISON}$ increases from a value less than a predetermined current imbalance value, $I_{IMBALANCE}$, to a value more than $I_{IMBALANCE}$; and
c. a first bypass element which has a current through it, $I_{FIRST-BYPASS}$, which, when the circuit is subjected to an overcurrent and/or an overvoltage, changes and thus causes $I_{COMPARISON}$ to increase to more than $I_{IMBALANCE}$, thereby causing the comparison element to change the circuit interruption element from its normal state to its fault state.

28. A circuit according to claim 27, wherein the first bypass element comprises a first bypass component which
a. is connected in the operating circuit so that it spans one of the line sense point and the return sense point, but not the other of the line sense point and the return sense point, and is not part of a passthru line; and
b. has
  (1) a reduced-conducting state, in which it permits the flow of a current, $I_{FIRST-BYPASS}$, which is substantially less than $I_{IMBALANCE}$, which state it adopts when a voltage across it, $V_{FIRST-BYPASS}$, is less than a predetermined value $V_{FIRST-TRIP}$, and (2) a conducting state, in which it permits the flow of a current, $I_{FIRST-BYPASS}$, which is greater than $I_{IMBALANCE}$, which state it adopts when $V_{FIRST-BYPASS}$ increases from a value less than $V_{FIRST-TRIP}$ to a value greater than $V_{FIRST-TRIP}$.

29. A circuit according to claim 28 wherein the first bypass component comprises a non-linear device comprising a first diode comprising an anode and a cathode, and a second diode comprising an anode and a cathode, the first and second diodes being connected in parallel, with the anode of the first diode connected to the cathode of the second diode and the cathode of the first diode connected to the anode of the second diode.

30. A circuit according to claim 29 wherein the first bypass component comprises a resistor connected in series with the non-linear device.

31. A circuit according to claim 28, comprising a first control element, which, a. (1) when the first bypass component spans the line sense point, is series connected in the current-carrying line within the span of the first bypass component; or (2) when the first bypass component spans the return sense point, is series connected in the return line within the span of the first bypass component; and b. has a voltage across it, $V_{FIRST-CONTROL}$, which (1) is less than $V_{FIRST-TRIP}$ when $I_{LINE}$ is less than a predetermined value $I_{FIRST-TRIP}$, thereby causing the voltage across the first bypass component to be less than $V_{FIRST-TRIP}$, and (2) becomes greater than $V_{FIRST-TRIP}$ when $I_{LINE}$ increases from a value less than $I_{FIRST-TRIP}$ to a value greater than $I_{FIRST-TRIP}$, thereby causing the voltage across the first bypass component to exceed $V_{FIRST-TRIP}$.

32. A circuit according to claim 31, wherein the first control element comprises a resistor.

33. A circuit according to claim 31, comprising a. a second control element, which (1) (a) when the first control element is series-connected in the current carrying line, is series connected in the current-carrying line and is not within the span of the first bypass element, or (b) when the first control element is series-connected in the return line, is series connected in the return and is not within the span of the first bypass element, and (2) has a variable resistance which (a) is low compared to the load when the circuit current is the normal current, $I_{NORMAL}$, and (b) increases substantially when the circuit current substantially exceeds the normal current, $I_{NORMAL}$; and b. a second bypass element, which (1) is connected so that it spans both the second control element and the first bypass element, and (2) has a resistance such that (a) when the circuit current is $I_{NORMAL}$, the ratio of the resistance of the second bypass element to the resistance of the second control element is such that the current in the second bypass element is substantially less than $I_{IMBALANCE}$, and (b) when the circuit current exceeds $I_{NORMAL}$ by a predetermined current amount, the ratio of the resistance of the second bypass element to the resistance of the second control element is such that the current in the second bypass element exceeds $I_{IMBALANCE}$.

34. A circuit according to claim 33, wherein the second bypass element comprises a resistor.

35. A circuit according to claim 33, wherein the second control element comprises a PTC device.

36. A circuit according to claim 35, wherein the second control element comprises a voltage clamping device connected in parallel with the PTC device.

37. A circuit according to claim 28, wherein $I_{FIRST-BYPASS}$ is less than $0.10 \times I_{IMBALANCE}$ when $I_{LINE}$ is $0.90 \times I_{FIRST-TRIP}$.

38. A circuit according to claim 27, wherein the first bypass element comprises a second bypass component which:

a. is connected between the line sense input and the return sense input;

b. is connected between the line sense output and the return sense output;

c. is connected between the line sense input and the return sense output and comprises a passthru line; or d. is connected between the line sense output and the return sense input and comprises a passthru line.

39. A circuit according to claim 38 wherein the second bypass component comprises a voltage-dependent device which has a current through it, $I_{DEVICE}$, which a. is less than $I_{IMBALANCE}$, when a voltage across the voltage-dependent device, $V_{DEVICE}$, is less than a predetermined value, $V_{SECOND-TRIP}$; and b. becomes greater than $I_{IMBALANCE}$, when $V_{DEVICE}$ increases from a value less than $V_{SECOND-TRIP}$ to a value greater than $V_{SECOND-TRIP}$.

40. A circuit according to claim 39 wherein the voltage dependent device comprises a voltage clamping or foldback device.

41. A circuit according to claim 39, wherein $I_{DEVICE}$ is less than $0.10 \times I_{IMBALANCE}$ when $V_{DEVICE}$ is $0.90 \times V_{SECOND-TRIP}$.

42. A circuit according to claim 38, wherein a. the second bypass component comprises a switching device which has a closed state which permits the flow of a current, $I_{SECOND-BYPASS}$, which is greater than $I_{IMBALANCE}$, and an open state which permits the flow of a reduced current, $I_{SECOND-BYPASS}$, which is substantially less than $I_{IMBALANCE}$; and b. the system comprises a first control element which, when $I_{LINE}$ is less than a predetermined value $I_{SECOND-TRIP}$, causes the switching device to be in its open state, and when $I_{LINE}$ increases from a value less than $I_{SECOND-TRIP}$ to a value greater than $I_{SECOND-TRIP}$, causes the switching device to switch from its open state to its closed state.

43. A circuit according to claim 42 wherein a. the first control element comprises a current responsive component having (1) a deenergized state, when $I_{LINE}$ does not exceed $I_{SECOND-TRIP}$.

(2) an energized state, when $I_{LINE}$ has increased from a value less than $I_{SECOND-TRIP}$ to a value greater than $I_{SECOND-TRIP}$; and b. the switching device comprises a bypass switch which is coupled with the current responsive component, and which is (1) open when the current responsive component is in the deenergized state, and (2) closed when the current responsive component is in the energized state.

44. A circuit according to claim 43 wherein the current responsive component comprises a current-sensing relay coil which is series connected in the current-carrying line or the return line, and the bypass switch comprises a set of relay contacts which are coupled with the current-sensing relay coil.

45. A circuit according to claim 42 wherein the second bypass component comprises a resistor connected in series with the switching device.

46. A circuit according to claim 38, comprising
 a. a second control element, which
  (1) is series connected in the current-carrying line in series with the line-side of the comparison element, and
  (2) has a variable resistance which
   (a) is low compared to the load when the circuit current is the normal current, $I_{NORMAL}$, and
   (b) increases substantially when the circuit current substantially exceeds the normal current, $I_{NORMAL}$; and
 b. a second bypass element, which
  (1) is connected so that it spans both the second control element and the line-side of the comparison element, and
  (2) has a resistance such that
   (a) when the circuit current is $I_{NORMAL}$, the ratio of the resistance of the second bypass element to the resistance of the second control element is such that the current in the second bypass element is substantially less than $I_{IMBALANCE}$, and
   (b) when the circuit current exceeds $I_{NORMAL}$ by a predetermined current amount, the ratio of the resistance of the second bypass element to the resistance of the second control element is such that the current in the second bypass element exceeds $I_{IMBALANCE}$.

47. A circuit according to claim 46, wherein the second bypass element comprises a resistor.

48. A circuit according to claim 46, wherein the second control element comprises a PTC device.

49. A circuit according to claim 48, wherein the second control element comprises a voltage clamping device connected in parallel with the PTC device.

50. A circuit according to claim 27, wherein the circuit interruption element comprises a first circuit switch which is connected in the current carrying line, and which is closed when the circuit interruption element is in the normal state and open when the circuit interruption element is in the fault state.

51. A circuit according to claim 50, wherein the circuit interruption element comprises a second circuit switch which is connected in the return line, and which is closed when the circuit interruption element is in the normal state and open when the circuit interruption element is in the fault state.

52. A circuit according to claim 27 wherein the comparison element comprises a GFI circuit.

\* \* \* \* \*

UNITED STATES PATENT AND TRADEMARK OFFICE

CERTIFICATE OF CORRECTION

PATENT NO.      : 5,745,322

INVENTOR(S)    : Duffy et al.

DATED             : April 28, 1998

It is certified that error appears in the above-identified patent and that said Letters Patent is hereby corrected as shown below:

Column 12, line 66, replace "PCT circuit 10" by --GFI circuit 10--.

Column 12, line 67, replace "GFI device 62" by --PTC device 62--.

Signed and Sealed this

Tenth Day of November 1998

*Attest:*

BRUCE LEHMAN

*Attesting Officer*                          *Commissioner of Patents and Trademarks*